Patented May 1, 1951

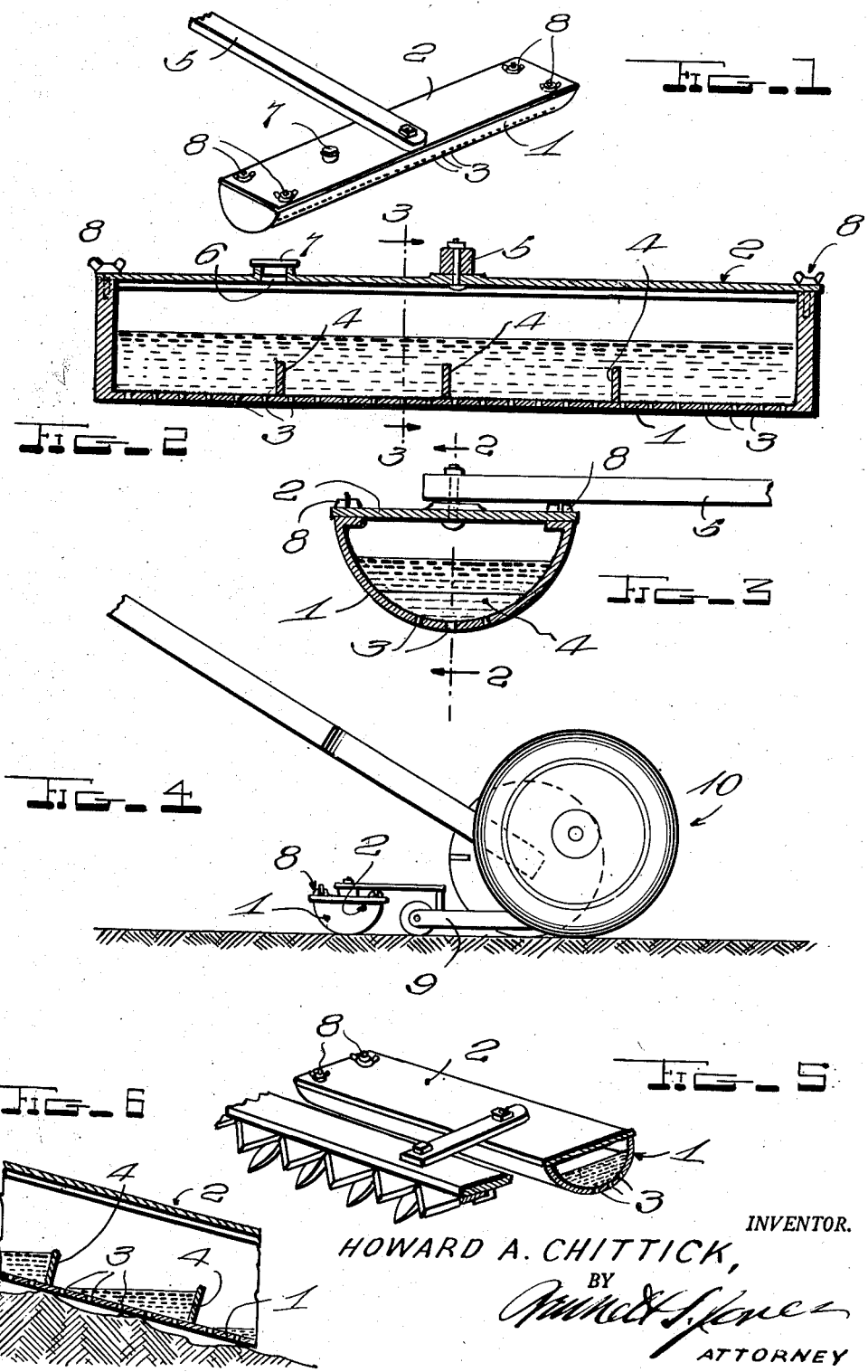
May 1, 1951  H. A. CHITTICK  2,551,096
APPLICATOR FOR WEED-KILLING LIQUID
Filed July 11, 1947
INVENTOR.
HOWARD A. CHITTICK,
BY
ATTORNEY

2,551,096

UNITED STATES PATENT OFFICE 2,551,096

APPLICATOR FOR WEED-KILLING LIQUID

Howard A. Chittick, McLean, Va., assignor to Horace V. Wester, McLean, Va.

Application July 11, 1947, Serial No. 760,291

4 Claims. (Cl. 47—1)

This invention is directed to an apparatus for distribution of the well-known weed exterminator commercially referred to as 2,4-D in order that the 2,4-D will directly reach the weeds to be exterminated, and will be prevented in large degree from reaching, by wind-drift or otherwise, the nearby broad-leaved plants which would be damaged by contact with 2,4-D.

The term 2,4-D is the abbreviation for 2,4 dichlorophenoxyacetic acid, or its salt and ester derivatives which are commonly used for exterminating weeds. The abbreviation 2,4-D is accepted in the trade and is used to designate the acid, salts or esters of this compound.

The 2,4-D compounds are particularly valuable for controlling weeds in turf as the compounds are highly selective in exterminating broad-leaved weeds and garlic without injuring the important lawn grasses, such as Kentucky blue, redtop, Bermuda, and the fescues.

Until the present invention was developed, 2,4-D was applied for killing weeds in the form of a spray, powder, or mixed in mineral fertilizer. In applying 2,4-D by these three methods, the materials were dispersed into the air and in so-doing, the danger was always present that the 2,4-D would be wind-borne and carried to ornamental or other valuable plants usually resulting in their injury or destruction.

The chemical 2,4-D is widely distributed commercially as a weed extermination agent, that is, a broad-leaf destroyer and if permitted to reach the broad-leaf ornamentals growing in a garden for example, such ornamentals will be seriously affected to their destruction which is of course objectionable.

The usual lawn grass, from which it is desired to remove the weeds in the use of the chemical referred to are not affected to any appreciable extent by the 2,4-D and while this chemical has been widely used for weed elimination, no means are known to eliminate the chemical, in its application to the weeds from reaching the ornamentals which it is desired to protect against contact of the chemical.

The many commercial concerns distributing the chemical 2,4-D as a weed exterminator have so far as known offered only two ways for applying the chemical, that is by a spraying operation or by dusting the chemical as a powder. The manufacturers and distributors of the chemical recognize the liability of the chemical reaching the ornamentals to be protected with their destruction, and caution against this probability, but it is recognized that this probability is a real objectional probability, and that the value of the chemical would be materially advanced if the objection can be overcome.

The primary object of the present invention in connection with the method involved is the distribution of the chemical 2,4-D in liquid form in selected or desired concentration directly to the surface of the grass and weeds to apply such chemical directly to the surfaces of the grass and weeds and also to the tissue of the weeds, in order that the weeds may then receive a destructive application of the chemical without possibility of the chemical during such application reaching or affecting the ornamentals growing on the lawn or among the grass. Of course it is well known that the chemical does not affect the grass, usually blue grass of which most ornamental lawns are constructed.

The method lends itself to many advantages over the suggested methods of application advised by the commercial distributors of the chemical, in that it is applied as a liquid, the concentration of which may be of a character commensurate with the weed condition; the chemical may be applied by a simple and effective apparatus, easy to handle, charge with the liquid, and keep in proper condition; the absolute prevention of the spreading of the chemical beyond the points of direct application, to thus protect the adjacent ornamentals of the effect of the chemical; and the fact that the method of application will cover a larger area than any other proposed method of application without waste of the material.

The hazards to ornamental and other desirable plants in the use of 2,4-D are recognized by many commercial concerns which are distributing the product. The instructions for applying the various products call attention to the liability of injury to desirable plants as well as to the weeds.

The liability of wind-drift is a real objection to the chemical 2,4-D and the value of 2,4-D would be materially advanced by overcoming this objection.

The present invention together with the method involved eliminates wind-drift entirely. With this method and means for carrying it out, the chemical 2,4-D in liquid form in selected or desired concentrations is applied directly to the surface of grass and weeds with a slightly abrasive action. The direct contact and slight abrasion destroys the weeds but does not destroy the grass, and at the same time, because of the fact that the liquid is applied to the grass and weeds by direct contact, there is no chance of the 2,4-D becoming wind-borne and drifting to desirable plants which the operation is not intended to destroy.

The present invention and method of application results in a saving of material in the following ways:

1. Waste of material by wind-drift is eliminated.
2. The abrasive action results in greater control of weeds per unit of 2,4-D used.

The simple and effective apparatus covered by the present invention offers the following additional advantages:

1. The apparatus is easy to handle.
2. It is easy to keep in condition as there are no moving parts to become worn or maladjusted.
3. The volume of the storage tank can be greatly reduced, as compared with conventional tanks, because more concentrated solutions can be used, and a larger area can be covered per unit of 2,4-D.
4. The same apparatus can be used like a mop to treat selected small areas of turf, or as a lawn mower attachment for treating the entire turf area.
5. The simple apparatus can be produced and sold much more cheaply than the more complicated sprays which were used in the past.
6. The apparatus will serve for applying other herbicides, fungicides, insecticides, and fertilizers in liquid form to lawns or other vegetation in addition to 2,4-D.

The apparatus for carrying out the method described is illustrated in the accompanying drawings, in which:

Figure 1 is a perspective view of the mop applicator.

Figure 2 is a longitudinal section of the same.

Figure 3 is a transverse section of the same on the line 3—3 of Figure 2.

Figure 4 is a side elevation of an ordinary lawn mower (either hand or power) with the applicator applied thereto.

Figure 5 is a perspective view of the cutter blades of a sickle bar mower, showing the applicator applied thereto.

Fig. 6 is a fragmentary longitudinal section, similar to Fig. 2, illustrating the effect of the baffles when the applicator operates on a slope.

The applicator for carrying out the method comprises an elongated vessel 1, having a removable top or cover 2, the body of the vessel being rounded throughout its transverse length below the cover 2 to provide bottom 4. The entire bottom of the applicator is perforated with discharge openings 3; baffles 8 are provided inside the vessel to hold the liquid on the uphill side of the applicator when treating uneven turf areas or terraces. A handle 5 is connected to the top or cover 2 for handling the applicator and a filling opening 6 is formed on the cover 2 with a removable cap to permit introduction of the chemical, as at 7.

The bottom 4, while obviously constructed of any appropriate material is preferably constructed made of a sheet of rubber. With the bottom of rubber the applicator will yield in use to accommodate itself to variations in the surface to which it is being applied and thus insure constant application of the chemical over the full area of the applicator. Furthermore, the use of rubber insures a relatively greater friction with the surface of the grass and insures a more effective distribution of the chemical.

The bottom 4, of whatever material is provided with upstanding baffles 8 extends upwardly into the applicator for an appropriate distance. The baffles serve to prevent undisturbed flow of the chemical from one end to the other when the applicator is being applied to an inclined or undulating surface and hold sufficient chemical throughout the full surface of the bottom at all times regardless of the surface being treated. With rubber or plastic bottoms the baffles may be integrally formed with such bottom, while with metal or like bottoms the baffles may be soldered or otherwise secured in position. The baffles occupy the full transverse area of the interior of the body for their heights and insure a supply of chemical on the bottom of the body of the applicator regardless of the surface inclination to which it is being applied.

The applicator is designed to be supplied with a desired quantity and concentration of chemical in liquid form. It is applied to the surface of the grass and drawn over the same by the handle, with or without pressure from the handle, causing the charged liquid to be delivered directly to the weeds and grass, without spreading materially beyond the lower surface of the applicator. Thus the liquid exterminator may be readily and simply applied without possibility of spreading in harmful contact with the ornamental or other economic plants which would be otherwise liable to destruction by the chemical.

The applicator, equipped with the mop-like handle is intended to be used for sections of lawns where the weeds are concentrated.

For more general and less tedious application of the liquid exterminator, the cover 2 may be provided with conventional clips or fasteners 8 to permit fastening to the cutting blade 9 of a hand or power lawn mower as indicated at 10. The handle 5 is of course removed, and then during the ordinary use of the lawn mower, the liquid exterminator is distributed automatically without wind-drift over the lawn area which is being mowed.

The applicator may also and with equal facility be applied to the cutting blades of a power sickle bar mower for the application of the exterminator in the use of that type mower.

The improved method of distribution of the well-known weed destroyer 2,4-D is of value as compared with the advertised and only methods of distribution proposed by most of the numerous commercial sellers of this chemical, for the method permits the use of the chemical as a liquid by direct contact with the plants to be controlled, preventing the spread of the chemical to the adjacent ornamentals and other valuable plants which it is desired to protect, whereas, with the advertised methods of spraying, dusting, etc., proposed by most of the commercial distributors, the spraying or dusting is practically certain to cause the chemical to reach the valuable plants as well as the weeds.

Having thus described the invention, what is claimed as new, is:

1. A distributor for the liquid solution of a liquid carrying a selected concentration with water, including a vessel having a rounded perforated bottom and a top having a filling opening, and a series of upstanding baffles rising from and connected to the bottom for the full width of the interior of the distributor but of less height to maintain constant distribution of the chemical under an inclined line of distribution.

2. A construction as defined in claim 1, wherein the perforated bottom of the distributor is constructed of somewhat flexible rubber to insure the bottom following for distribution surfaces regardless of the irregularities of inclination of the surface being treated.

3. A liquid applicator comprising an elongated tank for holding the liquid, said tank having perforations through the bottom thereof, means for controlling the flow of liquid from said tank through said perforations, and transverse baffles in said tank projecting vertically from and connected to the bottom thereof, the height of said baffles being less than the inside height of the tank.

4. A liquid applicator comprising an elongated tank having a convex bottom and perforations through said bottom, means for controlling the flow of liquid from said tank through said perforations and transverse vertical baffles in said tank projecting part way from the bottom to the top, said baffles being connected to the bottom of the tank.

HOWARD A. CHITTICK.

REFERENCES CITED

The following references are of record in the file of this patent:

UNITED STATES PATENTS

| Number | Name | Date |
|---|---|---|
| 521,164 | House | June 12, 1894 |

FOREIGN PATENTS

| Number | Country | Date |
|---|---|---|
| 114,164 | Australia | Nov. 13, 1941 |